United States Patent [19]
Katz et al.

[11] Patent Number: 4,741,912

[45] Date of Patent: May 3, 1988

[54] CONTINUOUS MULTISTAGE ISOTHERMAL FRYING PROCESS TO PRODUCE HIGH CRUNCH POTATO CHIPS

[75] Inventors: Edward Katz, St. Louis County; Richard G. Pachl, St. Louis, both of Mo.

[73] Assignee: Anheuser-Busch Companies, Inc., St. Louis, Mo.

[21] Appl. No.: 811,948

[22] Filed: Dec. 19, 1985

[51] Int. Cl.$^4$ ............................................. A23L 1/217
[52] U.S. Cl. .................................................... 426/438
[58] Field of Search ..................... 426/438, 441, 637

[56] References Cited

U.S. PATENT DOCUMENTS

| | | | |
|---|---|---|---|
| 2,056,884 | 10/1936 | Brunstetter | 426/637 |
| 3,149,978 | 9/1964 | Anderson et al. | 426/441 X |
| 3,934,046 | 1/1976 | Weaver et al. | 426/441 X |
| 4,317,842 | 3/1982 | El-Hag et al. | 426/438 X |
| 4,503,127 | 3/1985 | Fan et al. | 426/637 X |
| 4,537,786 | 8/1985 | Bernard | 426/438 |
| 4,585,660 | 4/1986 | Sugisawa et al. | 426/438 |

*Primary Examiner*—Arthur L. Corbin
*Attorney, Agent, or Firm*—Gravely, Lieder & Woodruff

[57] ABSTRACT

A continuous process for frying potato chips to produce a darker crunchy chip having the characteristics of batch type frying, said process using substantially isothermal frying zones.

9 Claims, 1 Drawing Sheet

CONTINUOUS MULTISTAGE ISOTHERMAL FRYING PROCESS TO PRODUCE HIGH CRUNCH POTATO CHIPS

BACKGROUND OF THE INVENTION

Conventionally potato chips are fried in a large kettle in a batch process.

Kettle frying of potato chips results in a firm texture high crunch chip. Commercial kettle frying of potato chips results in U-shaped oil temperature curve. After dropping potato slices into the oil, the oil temperature drops rapidly as the heat required to evaporate the high amount of water in the potatoes is consumed, generally faster than the burner can restore heat to the oil. After much of the water is evaporated, the heat load declines and the oil temperature moves higher. Frying is usually completed at an oil temperature near to, but somewhat below, the starting temperature.

Some typical commercial kettle frying conditions for 0.072" thick potato slices are as follows:

TABLE NO. 1

| Starting Temp. (°F.) | Type Potato | |
|---|---|---|
| | Russet Burbank | Norchip |
| Starting Oil Temp. (°F.) | 300–325 | 300–335 |
| Lowest Oil Temp. (°F.) | 240–270 | 260–280 |
| Final Oil Temp. (°F.) | 275–300 | 300–315 |
| Frying Time (min.) | 7–10 | 8–12 |

Specific frying curves for commercial batches of Russet Burbank potatoes and for Norchip potatoes are as follows:

| Run No. I. Russet Burbank Potatoes Loading 55 Lbs. Potatoes/238 Gal. Oil (Cottonseed) Slice Thickness = 0.072"; Potato H$_2$O = 78.2% | |
|---|---|
| Time (Min.) | Oil Temp. (°F.) |
| 0 | 305 |
| 1 | 266 |
| 2 | 266 |
| 3 | 267 |
| 4 | 270 |
| 5 | 273 |
| 6 | 283 |
| 7.5 | 284 |

| Run No. II. Norchip Potatoes Loading 55 Lbs. Potatoes/215 Gal. Oil (Cottonseed) Slice Thickness = 0.075"; Potato H$_2$O = 78.8% | |
|---|---|
| Time (Min.) | Oil Temp. (°F.) |
| 0 | 325 |
| 1 | 272 |
| 2 | 278 |
| 3 | 282 |
| 4 | 281 |
| 5 | 286 |
| 6 | 294 |
| 7 | 299 |
| 8.5 | 307 |

Russet Burbank potatoes contain higher sugar content and thus produce a darker, sweeter chip. These potatoes are used to make a dark Maui style chip, and when kettle fried, produce a dark, sweeter crunchy chip. Norchips, when kettle fried, produce a lighter colored, less sweet crunchy chip.

Some of the general characteristics of batch kettle frying are:
(a) produces a good firm texture (high crunch) chip,
(b) longer frying time than a standard continuous process,
(c) a U-shaped oil temperature curve during frying,
(d) is labor intensive, i.e., one kettle fryer normally requires 1 man and will produce about 75–150 Lbs./hour of chips, whereas a large continuous fryer may produce 4000 Lbs./hour of chips and require only 2 people to operate it,
(e) produces a darker chip having more hardness than a chip fried in a continuous process.

Accordingly, it is a principal object of this invention to provide a continuous frying process that will produce chips having the quality, texture, color and hardness of chips produced by the batch kettle process.

A further object is to provide a chip frying process which provides higher throughput, plus lower labor costs, than a batch system.

Still another object is to provide a continuous process for producing Maui type potato chips.

These and other objects and advantages will become apparent hereinafter.

SUMMARY OF THE INVENTION

The present invention comprises a continuous chip frying process involving isothermal temperature zones for producing potato chips in a fast efficient rate with the chips having the desirable characteristics of chips made by a conventional batch process.

DETAILED DESCRIPTION

I have found that using a two or three-stage isothermal frying process will produce good appearing potato chips with good crunch with both Russet Burbank and Norchip potatoes and will work as well with other varieties having similar characteristics. The essential steps in the process are a slow fry at lower temperatures to remove water without darkening chips, and a finish fry at higher temperature and for a short time to remove the last amounts of water, darken the chips, and produce a firm chip texture (crunch).

In the three-stage process, an initial very short high temperature fry is added.

It is preferred to use a series of fryers, each having a separate isothermal temperature with the temperature drop in each fryer (zone) being less than 10° F. This will require that the oil in each vessel be circulated and that there be suitable heat recovery capabilities in each fryer, particularly in the early stages of the process. In other words, water is being evaporated from the individual potato slices and as the water is evaporated, the oil is cooled because of the heat (BTU) loss from the oil to boil the water away. Thus, the initial heat input must be high, followed by declining heat input sufficient to maintain substantially constant oil temperature across the isothermal temperature zone.

An alternative construction is to use a multizone fryer, but it is difficult to maintain two or three significantly different isothermal temperature zones in the same body of oil while moving chips continuously through the body of oil without any temperature gradient between the zones.

Figure 1:
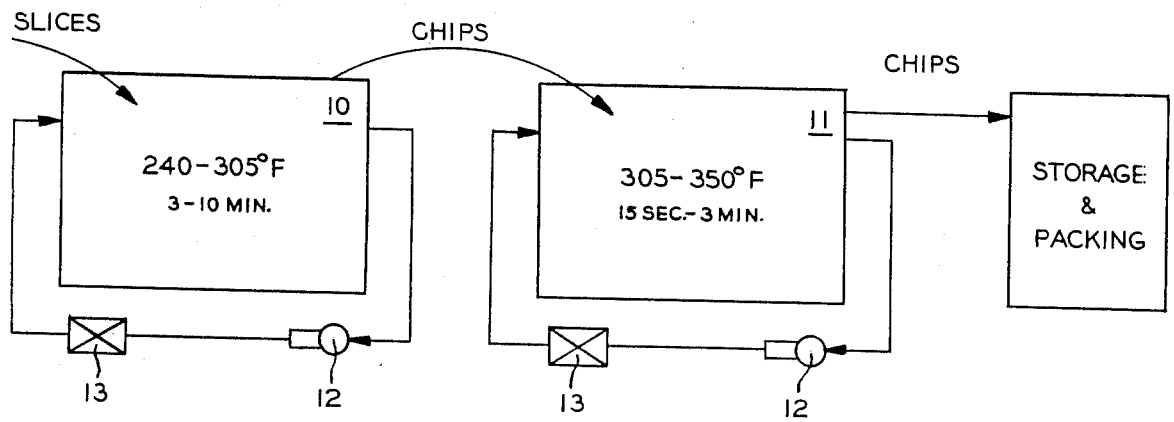
FIG. 1 is a schematic flow diagram of a two-stage continuous chip frying process.
Figure 2:
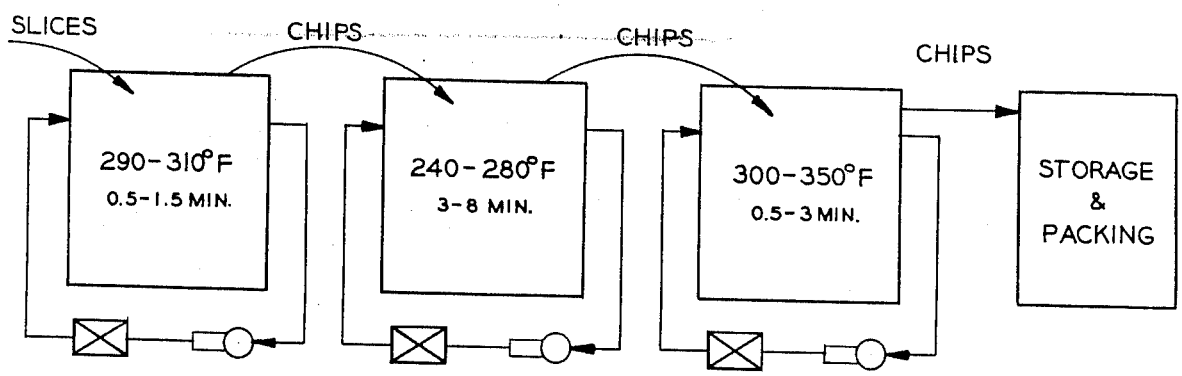
FIG. 2 is a schematic flow diagram of a three-stage continuous chip frying process.

FIG. 1 shows a two-stage fryer with two kettles 10 and 11, each with a circulating pump 12 combined with a heat exchanger 13 for hot vegetable frying oil, preferable cottonseed oil. The heat source 13 is located at each kettle 10 and 11 to maintain the temperature in the kettles at predetermined levels. It is critical that the temperature drop in each of the kettles 10 and 11 is less than 16° F., and preferably less than 10° F. at any time. The potatoes are moved through each kettle by the movement of the hot oil from the pump 12 and heat exchanger 13. The potatoes are moved between the kettles 10 and 11 and into the storage area by conventional conveyors.

Following are typical two-stage processes for Russet and for Norchip potatoes:

TABLE NO. 2

Slice Thickness - 0.065"-0.080" Range 0.070"-0.075" Preferred

|  | Russets | | Norchip | |
| --- | --- | --- | --- | --- |
|  | Oil Temp. (°F.) | Time (Min.) | Oil Temp. (°F.) | Time (Min.) |
| First Stage | | | | |
| Range | 240–270 | 4–8 | 260–305 | 3–10 |
| Preferred | 260 | 5–7 | 250–280 | 6–10 |
| Second Stage | | | | |
| Range | 330–340 | 0.25–2.0 | 305–350 | 0.5–3.0 |

TABLE NO. 2-continued

Slice Thickness - 0.065"-0.080" Range 0.070"-0.075" Preferred

|  | Russets | | Norchip | |
| --- | --- | --- | --- | --- |
|  | Oil Temp. (°F.) | Time (Min.) | Oil Temp. (°F.) | Time (Min.) |
| Preferred | 340 | 0.5–1.0 | 340 | 0.5–1.0 |

Following are typical ranges of temperatures and fry times for three-stage processes with Russet and Norchip potatoes:

TABLE NO. 3

|  | Russets | | Norchip | |
| --- | --- | --- | --- | --- |
|  | Oil Temp. (°F.) | Time (Min.) | Oil Temp. (°F.) | Time (Min.) |
| First Stage | | | | |
| Range | 290–310 | 0.1–1.0 | 290–310 | 0.5–1.5 |
| Preferred | 305 | 0.5 | 305 | 1.0 |
| Second Stage | | | | |
| Range | 250–270 | 4–7 | 240–280 | 3–8 |
| Preferred | 260 | 5–6 | 260 | 4–7 |
| Third Stage | | | | |
| Range | 325–340 | 1–3 | 300–350 | 0.1–3.0 |
| Preferred | 330–340 | 1–2 | 305 | 1.5 |
|  |  |  | 340 | 0.5 |

Following in Table No. 4 are specific runs in three-stage and two-stage processes using Russet Burbank potato slices of 0.072" in thickness.

TABLE NO. 4

| Run No. | Stage 1 | | Stage 2 | | Stage 3 | | Color Texture |
| --- | --- | --- | --- | --- | --- | --- | --- |
|  | Fry Time (Min.) | Temp. (°F.) | Fry Time (Min.) | Temp. (°F.) | Fry Time (Min.) | Temp. (°F.) |  |
| 67 | 1.0 | 305° | 3.0 | 260° | 1.5 | 305° | Agtron 3–4 Good Crunch |
| 68 | 1.5 | 305° | 3.0 | 260° | 1.0 | 305° | Agtron 3 Good Crunch |
| 69 | 1.5 | 305° | 5.0 | 260° | 1.5 | 330° | Agtron 3 Good Crunch |
| 70 | .5 | 305° | 3.0 | 260° | 2.0 | 330° | Agtron 4–5 Bitter No Crunch |
| 71 | .5 | 8° drop 305° | 5.0 | 260° | 1.5 | 6° drop 330° | Agtron 3 Good Crunch |
| 72 | .5 | 305° | 6.0 | 260° | 1.5 | 340° | Agtron 4–3 Slightly Bitter Good Crunch |
| 73 | .5 | 305° | 5.0 | 260° | 2.0 | 330° | Agtron 3–4 Very Good Crunch |
| 74 | 6.0 | 260° | 2.0 | 330° | — | — | Agtron 4–3 Slightly Bitter Very Good Crunch |
| 75 | 6.0 | 260° | 1.5 | 340° | — | — | Agtron 3–4 Excellent Crunch |
| 76 | 5.0 | 305° | — | — | — | — | Control Run Agtron 3 Not Crunchy |
| 77 | .5 | 305° | 5.0 | 260° | 2.0 | 330° | Agtron 4–3 Very Good Crunch |
| 78 | 6.0 | 260° | 1–1¼ | 340° | — | — | Agtron 3–4 Excellent Crunch |
| 79 | 7 | 260° | 1 | 340° | — | — | Agtron 3–4 Very Good Crunch |
| 80 | 8 | 260° | 1 | 340° | — | — | Agtron 4–3 Very Good Crunch |
| 81 | 5 | 270° | 1.15 | 340° | — | — | Agtron 3–4 Not Crunchy |
| 82 | 4 | 270° | 1.15 | 340° | — | — | Agtron 3 Good Crunch |
| 83 | 15. | 260° | — | — | — | — | Agtron 3 Very Good Crunch |
| 84 | 12. | 270° | — | — | — | — | Agtron 3 Not Crunchy |
| 85 | 10. | 280° | — | — | — | — | Agtron 3 Not Crunchy |
| 86 | 4.0 | 280° | 3.0 | 340° | — | — | Agtron 4–3 |

TABLE NO. 4-continued

| Run No. | Stage 1 | | Stage 2 | | Stage 3 | | Color Texture |
| --- | --- | --- | --- | --- | --- | --- | --- |
| | Fry Time (Min.) | Temp. (°F.) | Fry Time (Min.) | Temp. (°F.) | Fry Time (Min.) | Temp. (°F.) | |
| | | | | | | | Not Crunchy Blister |

From the point of view of economics of operation including equipment costs, maintenance, and efficiency, the two-stage process is preferred.

The combination of temperature drop limitation, frying retention time per stage, and heat recovery capabilities of the fryer will determine loading levels.

Slice thickness can vary for different type products, such as lattice chips, but frying retention time also will then need to be varied. This invention is applicable to chips of 0.04" to 0.25" in thickness. A lattice chip typically is 0.15"-0.20" in thickness.

Following are specific runs in three-stage and two-stage processes using Norchip potatoes of 0.072" in thickness.

TABLE NO. 5

| Run No. | Stage 1 | | Stage 2 | | Stage 3 | | Color Texture |
| --- | --- | --- | --- | --- | --- | --- | --- |
| | Fry Time (Min.) | Temp. (°F.) | Fry Time (Min.) | Temp. (°F.) | Fry Time (Min.) | Temp. (°F.) | |
| 1 | 1 | 305° | 3 | 260° | 1.5 | 305° | Agtron 1 Soft-Chewy |
| 2 | 1 | 305° | 5 | 260° | 1.5 | 305° | Agtron 1 Very Good |
| 3 | 8 | 260° | 1 | 340° | — | — | Agtron 1-2 Very Good |
| 4 | 7 | 260° | 1 | 340° | — | — | Agtron 2 Good |
| 5 | 6 | 305° | — | — | — | — | Agtron 1 Good |
| 6 | 7 | 305° | — | — | — | — | Agtron 2-1 Good |
| 7 | 9 | 260° | 1 | 340° | — | — | Agtron 2-1 Very Good |
| 8 | 10 | 260° | 1 | 340° | — | — | Agtron 2 Good |
| 9 | 9 | 260° | 2 | 305° | — | — | Agtron 2 Good |
| 10 | 6 | 260° | 3 | 305° | — | — | Agtron 1-2 Good |
| 11 | 7 | 260° | 1 | 305° | — | — | Agtron 1 Soft |

The data in Tables Nos. 4 and 5 support the ranges of time and temperature shown in Tables Nos. 2 and 3 respectively.

In Runs Nos. 83, 84 and 85, a long fry at low temperatures was tried. It is noted that 15 minutes at 260° F. produced a satisfactory chip, but shorter times, even at higher temperatures were not satisfactory. The use of a 15 minute or longer run would require additional capital cost and larger, longer fryers. Thus, the cost/pound of product is higher.

The present invention is intended to include all changes and modifications of the examples of the invention herein chosen for purposes of disclosure, which do not constitute departures from the spirit and scope of the invention.

What is claimed is:

1. A continuous process of frying potato chips to produce chips having the color and hardness of kettle fried chips comprising the steps of
    (a) forming potato slices from white potatoes,
    (b) placing the slices in a first stage oil bath having a temperature in the range of about 240°-305° F.,
    (c) holding the slices in said first stage oil bath for a first period of time to remove a substantial portion of the water in the slices while maintaining the oil temperature substantially isothermal,
    (d) moving the slices to a second stage oil bath having a higher temperature than the first stage and in the range of about 305°-350° F.,
    (e) holding the slices in said second stage oil bath for a second period of time shorter than the first period of time to add color and hardness to the slices while maintaining the oil temperature substantially isothermal, and
    (f) removing finished fully cooked chips from the second stage oil bath.

2. A continuous process of frying potato chips to produce chips having the color and hardness of kettle fried chips comprising the steps of
    (a) continuously frying the chips in oil in a plurality of stages in which the temperature of the oil in each stage is maintained substantially isothermal and the oil temperature in each stage is within the range of about 240°-350° F.,
    (b) holding the chips in one stage for a period of time to remove a substantial portion of the water in the chips while maintaining the oil temperature substantially isothermal,
    (c) moving the chips to a final stage having oil temperature higher than the oil temperature of the one stage,
    (d) holding the chips in said final stage for a period of time shorter than the period of time of the one stage to add color and hardness to the chips while maintaining the oil temperature substantially isothermal, and
    (e) removing a finished fully cooked chip from the final stage.

3. The process of claim 2 wherein the temperature drop in each stage is less than 10° F.

4. The process of claim 2 wherein heat is added to the oil baths at a rate to maintain the substantially isothermal oil conditions as water is evaporated from the chips.

5. The process of claim 2 wherein the chips are from Norchip or Russet Burbank potatoes and the slices are from 0.04"–0.25" in thickness.

6. The process as defined in claim 2 wherein there are only two stages, the temperature of the one stage being within the range of about 240°–305° F. and the temperature of the final stage being within the range of about 305°–350° F.

7. The process as defined in claim 6 wherein the period of time for the one stage is 3–10 minutes and the period of time for the final stage is 15 seconds–3 minutes.

8. The process as defined in claim 2 wherein there are three stages, an initial stage preceding the one stage wherein the temperature is within the range of about 290°–310° F., the temperature of the one stage being within the range of about 240°–280° F. and the temperature of the final stage being within the range of about 300°–350° F.

9. The process as defined in claim 8 wherein the period of time for the initial stage is 0.5–1.5 minutes, the period of time for the one stage is 3–8 minutes, and the period of time for the final stage is 0.5–3 minutes.

* * * * *